(12) United States Patent
Durity

(10) Patent No.: US 11,607,024 B1
(45) Date of Patent: Mar. 21, 2023

(54) MODULAR COMB SYSTEM

(71) Applicant: Noel Durity, Santa Ana, CA (US)

(72) Inventor: Noel Durity, Santa Ana, CA (US)

( * ) Notice: Subject to any disclaimer, the term of this patent is extended or adjusted under 35 U.S.C. 154(b) by 0 days.

(21) Appl. No.: 17/578,823

(22) Filed: Jan. 19, 2022

(51) Int. Cl.
*A45D 24/04* (2006.01)
*B29D 21/00* (2006.01)
*B21D 53/00* (2006.01)

(52) U.S. Cl.
CPC .............. *A45D 24/04* (2013.01); *B21D 53/00* (2013.01); *B29D 21/00* (2013.01); *Y10T 29/49947* (2015.01); *Y10T 29/49963* (2015.01)

(58) Field of Classification Search
CPC ........ A45D 24/04; B29D 21/00; B21D 53/00; Y10T 29/49947; Y10T 29/49963
See application file for complete search history.

(56) References Cited

U.S. PATENT DOCUMENTS

| 3,707,288 | A | * | 12/1972 | Edlefsen | A63B 49/038 473/532 |
| 4,274,634 | A | * | 6/1981 | Berluti | A63B 49/038 473/532 |
| 10,368,623 | B2 | | 8/2019 | Durity | |
| 2011/0287876 | A1 | * | 11/2011 | DeMasi | A63B 60/00 473/532 |

* cited by examiner

*Primary Examiner* — Jermie E Cozart
(74) *Attorney, Agent, or Firm* — John D. Tran; Rhema Law Group, P.C.

(57) ABSTRACT

A modular comb system and method can include: a frame including a comb body; a locking ring including a locking mechanism for mating with the comb body and for locking the locking ring to the comb body; and a screen insert configured to be in a fixed position with respect to the frame based on the locking ring being locked to the comb body.

18 Claims, 10 Drawing Sheets

MODULAR COMB SYSTEM

TECHNICAL FIELD

This disclosure relates to the hair care industry more particularly to hair care products and methods related to styling and caring for African-American hair.

BACKGROUND

The African-American hair industry represents a quickly expanding and highly varied market. One notable trend beginning in the last decade of the twentieth century was a shift away from harsh and harmful chemicals towards more natural means.

Although much development and innovation has advanced this growing market segment a need still remains for a simple, durable, portable, and washable product for creating beautiful, long lasting, natural African-American hair coils, which cannot be achieved with prior developments.

Many prior developments are longitudinal and comb-like in configuration which have heating or steaming elements for retaining the curl. These products fail to provide adequate solutions to short naturally curly hair.

Other prior developments have included brushes and combs with various types and shapes of bristles and teeth. These developments largely work to separate hair strands rather than provide a compact twist or coil of hair.

Yet other prior developments have relied on rotating elements powered by electric motors implemented with electric cords or batteries. These devices, although specifically designed to be effective with African-American hair, are implemented with excessive costs, and mechanical complexities which have multiple potential failure points.

Still other prior developments contain a sponge or sponge like material. The sponges however can maintain moisture and become dirty resulting in unsanitary applications in a user's hair.

Solutions have been long sought but prior developments have not taught or suggested any complete solutions, and solutions to these problems have long eluded those skilled in the art. Thus, there remains a considerable need for devices and methods that provide simple, durable, portable, and washable product for creating beautiful, long lasting, natural African-American hair coils.

SUMMARY

A modular comb system and methods, providing a simple, durable, portable, and washable product for creating beautiful, long lasting, natural African-American hair coils, are disclosed. The modular comb system and methods can include: a frame including a comb body; a locking ring including a locking mechanism for mating with the comb body and for locking the locking ring to the comb body; and a screen insert configured to be in a fixed position with respect to the frame based on the locking ring being locked to the comb body.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The modular comb system is illustrated in the figures of the accompanying drawings which are meant to be exemplary and not limiting, in which like reference numerals are intended to refer to like components, and in which.

DETAILED DESCRIPTION

Figure 1:
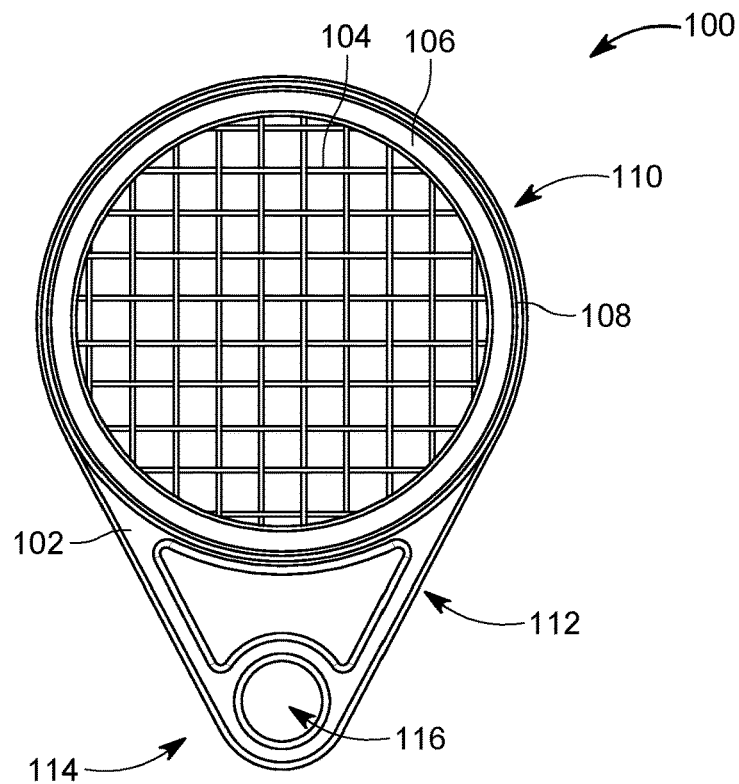
FIG. 1 is a front side view of the modular comb system in a first embodiment.

In the following description, reference is made to the accompanying drawings that form a part hereof, and in which are shown by way of illustration, embodiments in which the modular comb system may be practiced. It is to be understood that other embodiments may be utilized and structural changes may be made without departing from the scope of the modular comb system.

When features, aspects, or embodiments of the modular comb system are described in terms of steps of a process, an operation, a control flow, or a flow chart, it is to be understood that the steps can be combined, performed in a different order, deleted, or include additional steps without departing from the modular comb system as described herein.

The modular comb system is described in sufficient detail to enable those skilled in the art to make and use the modular comb system and provide numerous specific details to give a thorough understanding of the modular comb system; however, it will be apparent that the modular comb system may be practiced without these specific details.

In order to avoid obscuring the modular comb system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the modular comb system can be operated in any orientation.

As used herein, the term "coupled" means direct or indirect contact between components. For expository purposes, the term "vertical" as used herein is defined as a plane parallel to a front side of the hair system, regardless of its orientation. The term "horizontal" refers to a direction perpendicular to the vertical as just defined. Terms, such as "above", "below", "bottom", "top", "side", "higher", "lower", "upper", "over", and "under", are defined with respect to the horizontal plane.

Referring now to FIG. 1, therein is shown a front side view of the modular comb system 100 in a first embodiment. The modular comb system 100 is comprised of a frame 102, a screen insert 104, and a locking ring 106 including a locking mechanism 108.

Figure 2:
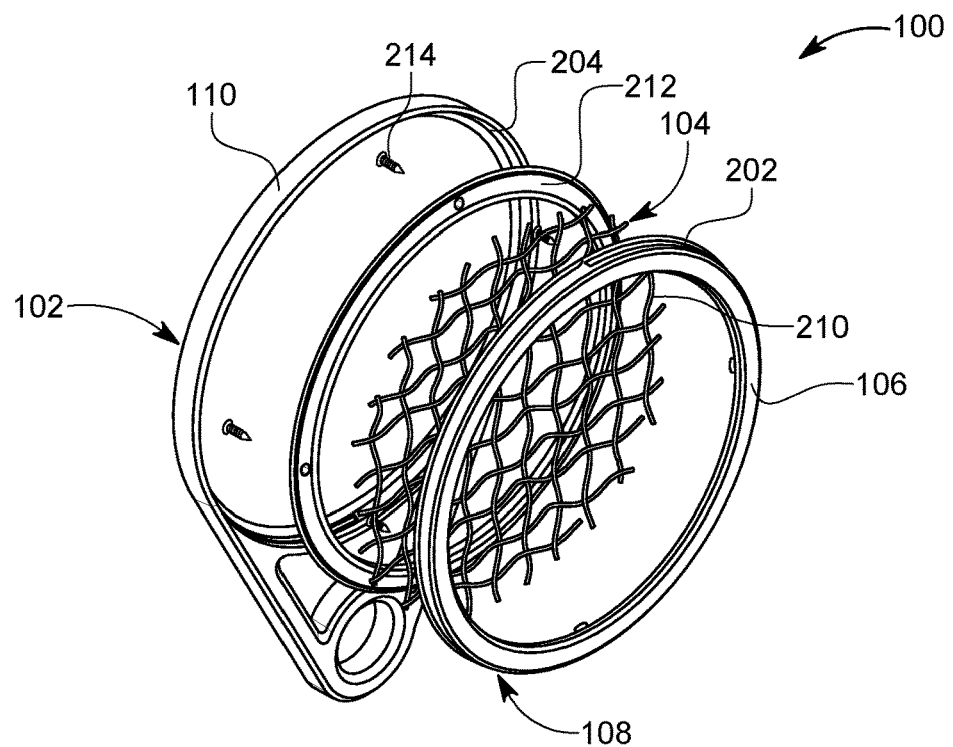
FIG. 2 is an isometric view exploded of the modular comb system of FIG. 1.

The screen insert 104 can be affixed to the frame 102 with the locking ring 106. The locking mechanism 108 can be threads as is shown in FIG. 2. The locking ring 106 includes the locking mechanism 108 for mating with a comb body 110 of the frame 102 and locking the locking ring 106 to the comb body 110.

The screen insert 104 is depicted in a fixed position with respect to the frame 102 based on the locking ring 106 being locked to the comb body 110. That is, screen insert 104 is shown affixed between the locking ring 106 and the frame 102.

The frame 102 can include the comb body 110 and a handle 112. The comb body 110 and the handle 112 can be integrally formed with or affixed during manufacture.

It is contemplated that the frame 102 can be formed of a durable washable material such as an injection molded plastic, metal, fiberglass, or a combination thereof. The frame 102 is contemplated to be formed in a size that can fit within a standard sized pants pocket.

Figure 12:
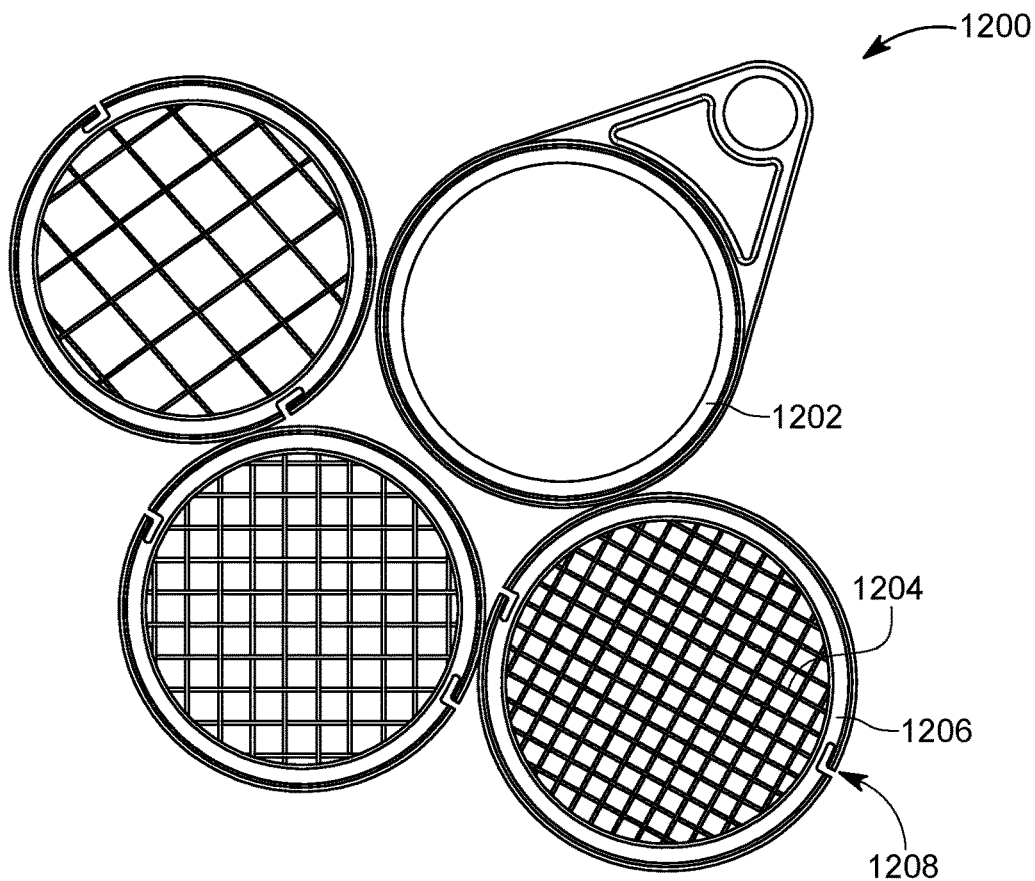
FIG. 12 is a frontside view of the modular comb system in a third embodiment and in a disassembled phase of operation.

The screen insert 104 can provide multiple different intersecting patterns. Illustrated herein are square patterns, which as shown in FIG. 12, can be of multiple different sizes. The screen insert 104 can be formed of a nylon, stainless steel, or similar situated material, which is durable, flexible, and washable.

The handle 112 can taper from the width of the comb body 110 to a circular end 114 having a hole 116. The circular end 114 having the hole 116 has been discovered to provide enhanced comfort and ergonomic manipulation of the modular comb system 100.

Referring now to FIG. 2, therein is shown an isometric view of the modular comb system 100 of FIG. 1. The modular comb system 100 is shown having the locking ring 106 and the screen insert 104 positioned over the comb body 110 of the frame 102.

The locking mechanism 108 is shown as male threads 202 on the locking ring 106, which can mate with and lock to female threads within the comb body 110. The male threads 202 mate and lock with female threads 204. The screen insert 104 can include a screen 210 and a screen ring 212.

The screen 210 can be held firmly between the locking ring 106 and the screen ring 212. The screen ring 212 can be affixed to the locking ring 106 with screws 214. When the screen insert 104 is attached to the locking ring 106 with the screws 214, the locking ring 106 can be mated with the frame 102 by twisting the locking mechanism 108.

Figure 3:
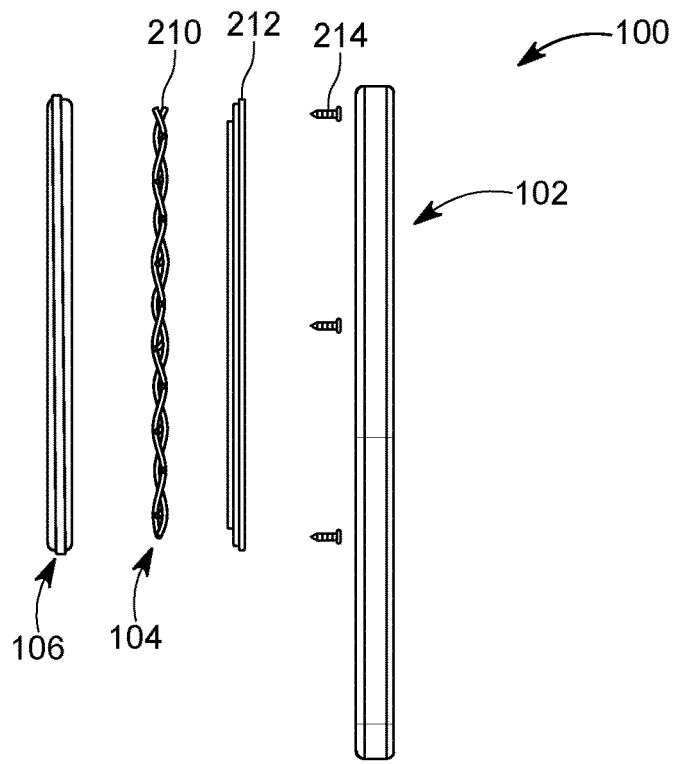
FIG. 3 is an exploded side view of the modular comb system of FIG. 1.

Referring now to FIG. 3, therein is shown an exploded side view of the modular comb system 100 of FIG. 1. The screen insert 104 can be affixed to the locking ring 106 with the screws 214.

The screen insert 104 can include the screen 210 and the screen ring 212, both of which can be fixed and positioned between the locking ring 106 and the frame 102. The screen ring 212 can fully cover edges of the screen 210.

Figure 4:
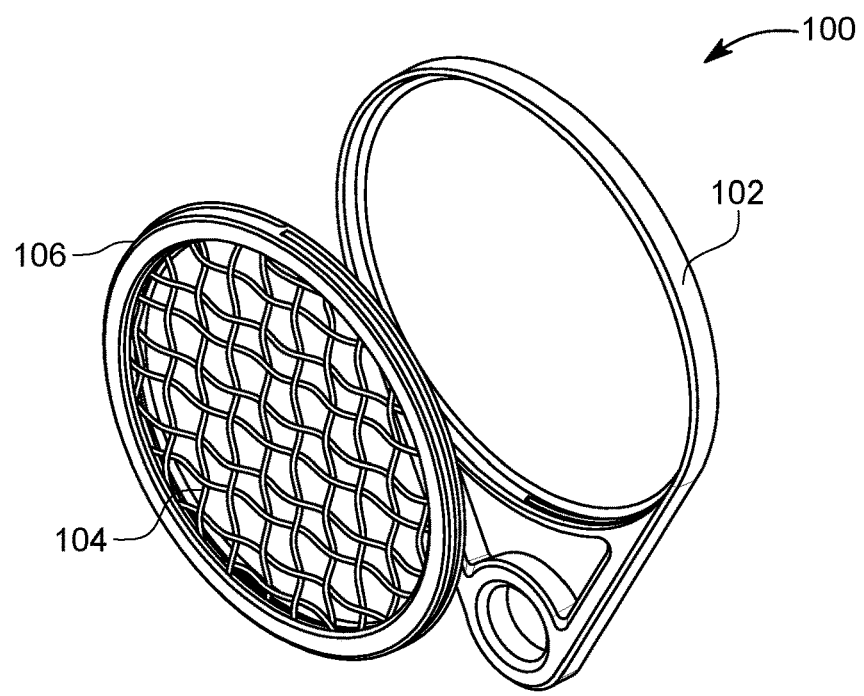
FIG. 4 is an isometric view of the modular comb system in a disassembled phase of operation.

Referring now to FIG. 4, therein is shown an isometric view of the modular comb system 100 in a disassembled phase of operation. The locking ring 106 is shown attached to the screen insert 104 and ready for mating with the frame 102.

Figure 5:
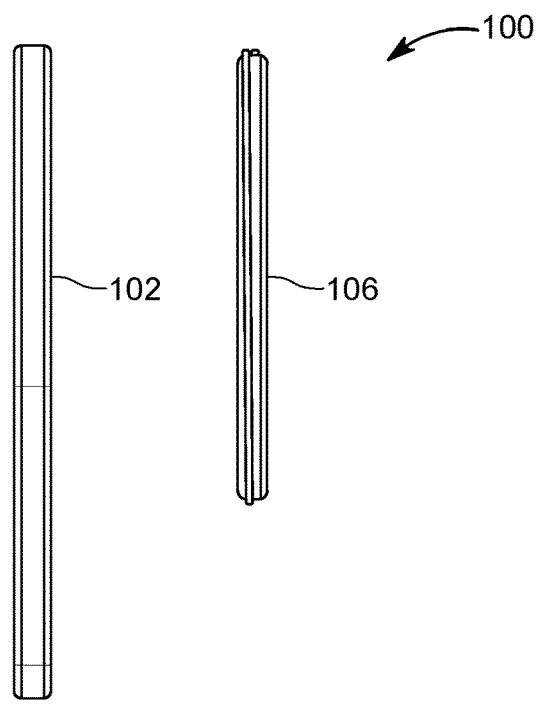
FIG. 5 is a side view of the modular comb system of FIG. 4.

Referring now to FIG. 5, therein is shown a side view of the modular comb system 100 of FIG. 4. The locking ring 106 is shown ready for mating with the frame 102.

Figure 6:
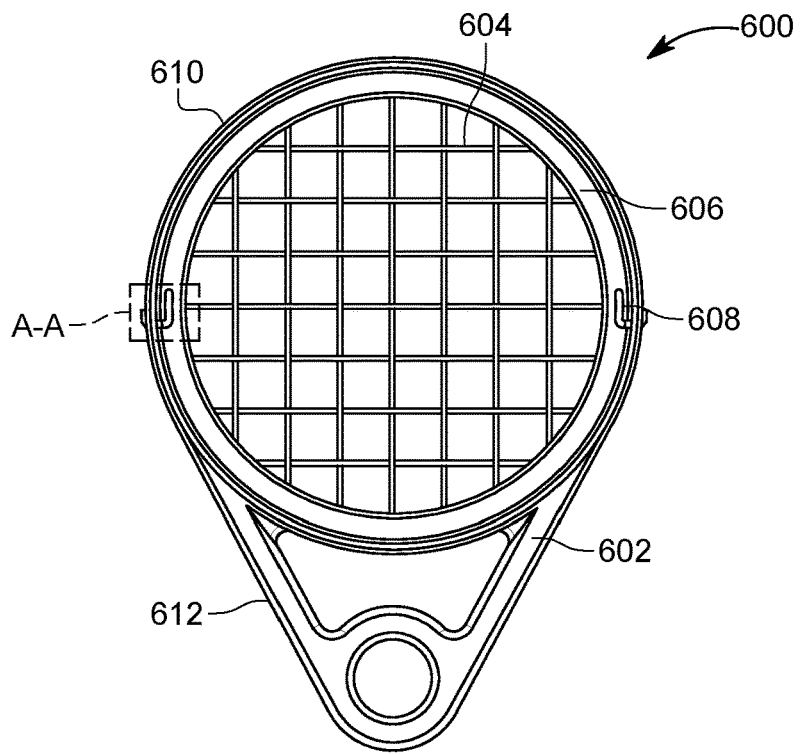
FIG. 6 is a frontside view of the modular comb system in a second embodiment.

Referring now to FIG. 6, therein is shown a frontside view of the modular comb system 600 in a second embodiment. The modular comb system 600 is comprised of a frame 602, a screen insert 604, and a locking ring 606 including a locking mechanism 608.

The screen insert 604 can be affixed to the frame 602 with the locking ring 606. The locking mechanism 608 can be a clip configured to mate with a recess in the frame 602, which is more fully depicted in FIGS. 7 and 10. The locking ring 606 includes the locking mechanism 608 for mating with a comb body 610 of the frame 602 and locking the locking ring 606 to the comb body 610.

The screen insert 604 is depicted in a fixed position with respect to the frame 602 based on the locking ring 606 being locked to comb body 610. That is, screen insert 604 is shown affixed between the locking ring 606 and the frame 602.

The frame 602 can include the comb body 610 and a handle 612. The comb body 610 and the handle 612 can be integrally formed with or affixed during manufacture.

It is contemplated that the frame 602 can be formed of a durable washable material such as an injection molded plastic, metal, fiberglass, or a combination thereof. The frame 602 is contemplated to be formed in a size that can fit within a standard sized pants pocket.

The screen insert 604 can provide multiple different intersecting patterns. Illustrated herein are square patterns, which as shown in FIG. 12, can be of multiple different sizes. The screen insert 604 can be formed of a nylon, stainless steel, or similar situated material, which is durable, flexible, and washable.

The handle 612 can taper from the width of the comb body 610 to a circular end 614 having a hole 616. The circular end 614 having the hole 616 has been discovered to provide enhanced comfort and ergonomic manipulation of the modular comb system 600.

Figure 7:
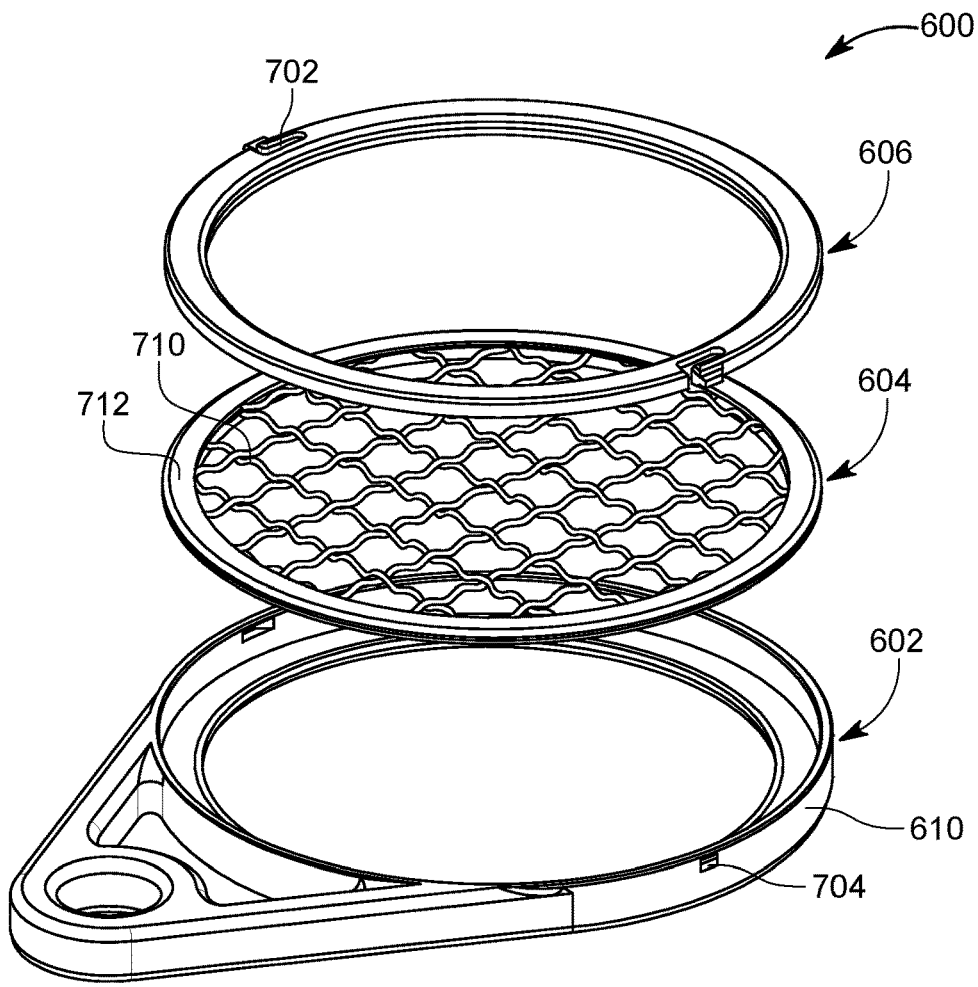
FIG. 7 is an isometric view of the modular comb system of FIG. 6 in a disassembled phase of operation.

Referring now to FIG. 7, therein is shown an isometric view of the modular comb system 600 of FIG. 6 in a disassembled phase of operation. The modular comb system 600 is shown having the locking ring 606 and the screen insert 604 positioned over the comb body 610 of the frame 602.

The locking mechanism 608 is shown as a clip 702 configured to mate with a recess 704 in the frame 602. The recess 704 can be a recess below a front of the frame 602 and can extend from an interior of the frame 602 to an exterior of the frame 602. The screen insert 604 can include a screen 710 and a screen ring 712.

The screen ring 712 can be formed around the screen 710 and formed to cover edges of the screen 710. The screen ring 712 can be affixed to the frame 602 by mating the locking mechanism 608 of the locking ring 606 to the frame 602, the screen insert 604 being between the frame 602 and the locking ring 606.

Figure 8:
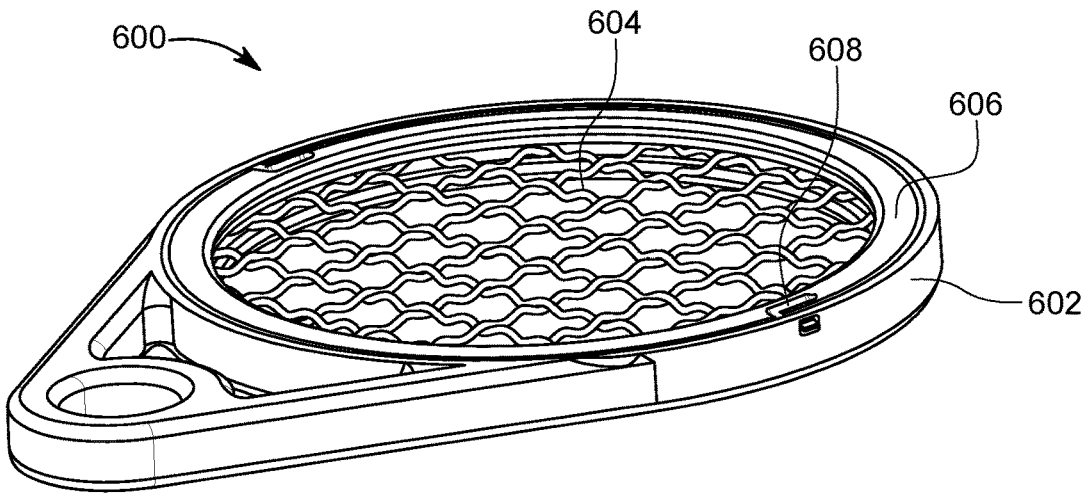
FIG. 8 is an isometric view of the modular comb system of FIG. 6.

Referring now to FIG. 8, therein is shown an isometric view of the modular comb system 600 of FIG. 6. The locking ring 606 is shown affixing the screen insert 604 to the frame 602.

The locking mechanism 608 of the locking ring 606 is mated with the frame 602. The locking ring 606 is depicted below a front surface of the frame 602.

Figure 9:
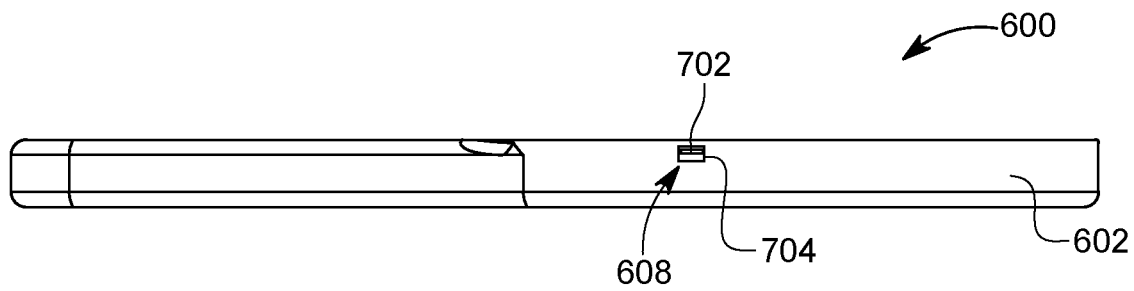
FIG. 9 is a side view of the modular comb system of FIG. 6.

Referring now to FIG. 9, therein is shown a side view of the modular comb system 600 of FIG. 6. The frame 602 is shown having the locking mechanism 608 mated therewith. Particularly, the clip 702 is depicted within the recess 704.

Figure 10:
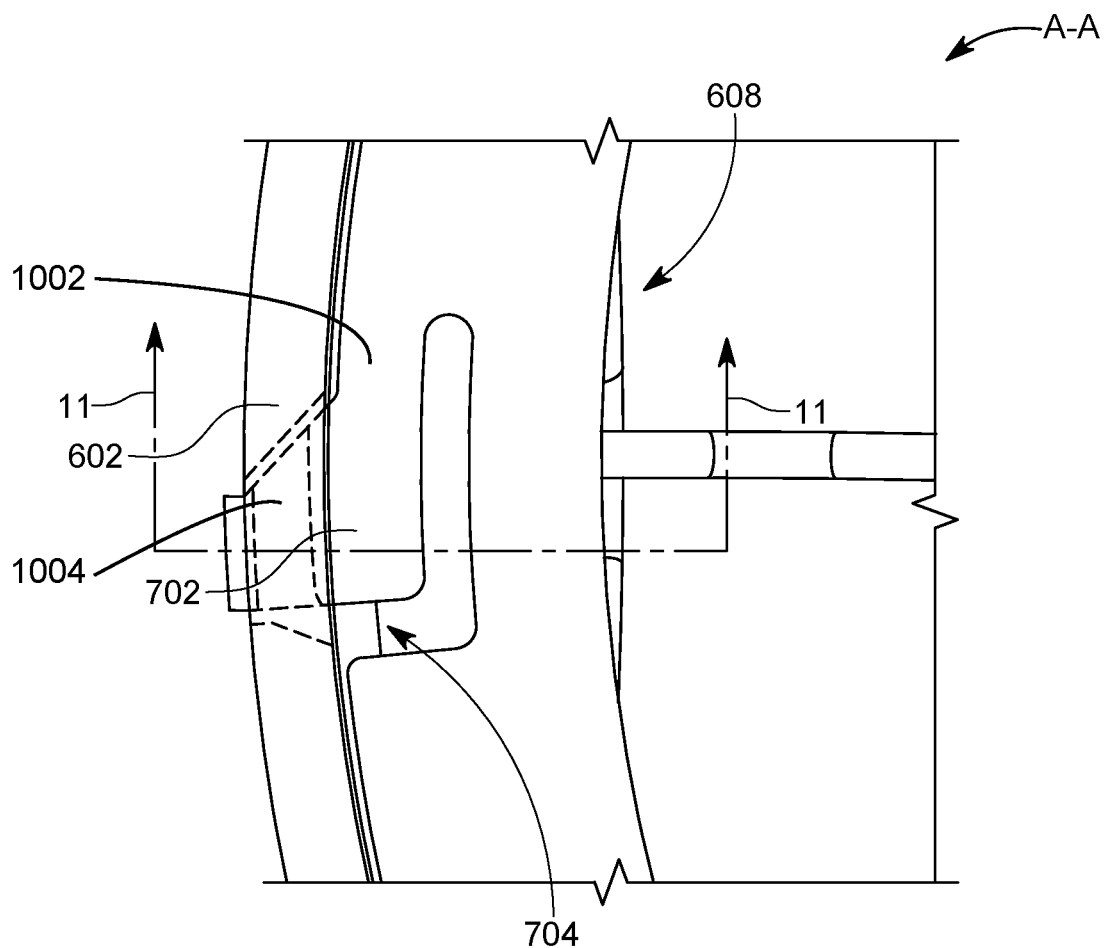
FIG. 10 is a frontside view of the region A-A of FIG. 6.

Referring now to FIG. 10, therein is shown a frontside view of the region A-A of FIG. 6. The region A-A depicts the locking mechanism 608 including the clip 702 which is mated with the recess 704.

The clip 702 can provide a snapping lock with the frame 602 by utilizing spring element 1002 coupled to a prong 1004. The spring element 1002 can provide a deformation resistance as the clip 702 deforms around the frame 602 when it is pressed into the recess 704.

The prong 1004 can rest in the recess 704 as the spring element returns to its original shape. The edges of the clip 702, the recess 704 and the frame 602 can be tapered to enable a smooth mating of the elements.

Figure 11:
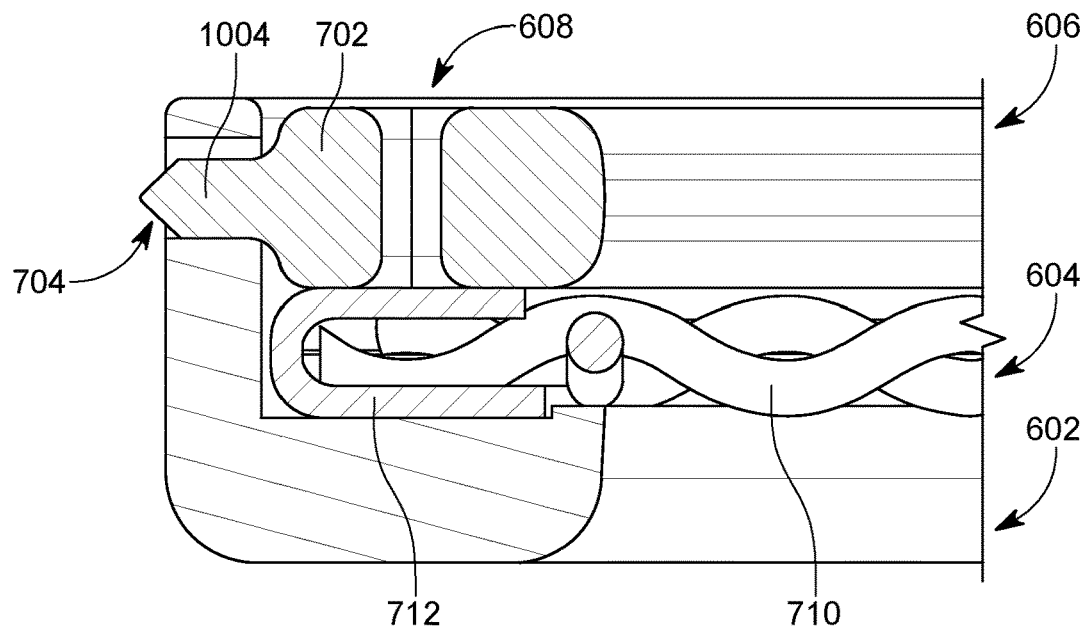
FIG. 11 is a cross-sectional view along the line 11-11 of FIG. 10.

Referring now to FIG. 11, therein is shown a cross-sectional view along the line 11-11 of FIG. 10. The screen insert 604 is shown affixed between the locking ring 606 and the frame 602.

The screen insert 604 is shown having the screen ring 712 folded around ends of the screen 710. Other embodiments could include the screen ring 712 injection molded or otherwise molded to the screen 710. The locking mechanism 608 is depicted as the clip 702, which is mated with the recess 704 having the prong 1004 extended through and exiting the recess 704 to be exposed from an external peripheral surface of the frame 602.

Referring now to FIG. 12, therein is shown a frontside view of the modular comb system 1200 in a third embodiment and in a disassembled phase of operation. The modular comb system 1200 is comprised of a frame 1202 and a screen insert 1204 integrally formed with a locking ring 1206.

That is, the screen insert 1204 can be manufactured with the locking ring 1206 molded over, or otherwise affixed edges of the screen, to form an integrated screen insert 1204 and locking ring 1206. For the purposes of this application, integral formation means that the elements are affixed during manufacturing and not designed to be taken apart during use. The locking ring 1206 includes a locking mechanism 1208.

The screen insert 1204 can be affixed to the frame 1202 with the locking ring 1206. The locking mechanism 1208 can be a clip configured to mate with a recess in the frame 1202, which is more fully depicted in FIGS. 7 and 10. The locking ring 1206 includes the locking mechanism 1208 for mating with a comb body 1210 of the frame 1202 and locking the locking ring 1206 to the comb body 1210.

The screen insert 1204 is depicted in a fixed position with respect to the frame 1202 based on the locking ring 1206 being locked to the comb body 1210. That is, screen insert 1204 is shown affixed between the locking ring 1206 and the frame 1202.

The frame 1202 can include the comb body 1210 and a handle 1212. The comb body 1210 and the handle 1212 can be integrally formed with or affixed during manufacture.

It is contemplated that the frame 1202 can be formed of a durable washable material such as an injection molded plastic, metal, fiberglass, or a combination thereof. The frame 1202 is contemplated to be formed in a size that can fit within a standard sized pants pocket.

The screen insert 1204 can provide multiple different intersecting patterns. Illustrated herein, the screen insert 1204 is depicted as one of multiple screen inserts having different sized screen holes.

It has been discovered, that forming the screen inserts 1204 having different sized screen holes, allows people of all different hair textures to use the modular comb system 1200. That is, providing the screen insert 1204 with more space between the wires of the screen insert 1204, will be tailored for larger curls and coarser textures of hair; while providing the screen insert 1204 with less space between the wires of the screen insert, will be tailored for smaller curls and finer textures of hair.

Since the screen insert 1204 is formed integrally with the locking ring 106, the screen insert 1204 can be simply snapped in and out of the frame 1202. In some contemplated embodiments, the screen insert 1204 can include the locking mechanism 1208. The screen insert 1204 can be formed of a nylon, stainless steel, or similar situated material, which is durable, flexible, and washable.

The handle 1212 can taper from the width of the comb body 1210 to a circular end 1214 having a hole 1216. The circular end 1214 having the hole 1216 has been discovered to provide enhanced comfort and ergonomic manipulation of the modular comb system 600.

Figure 13:
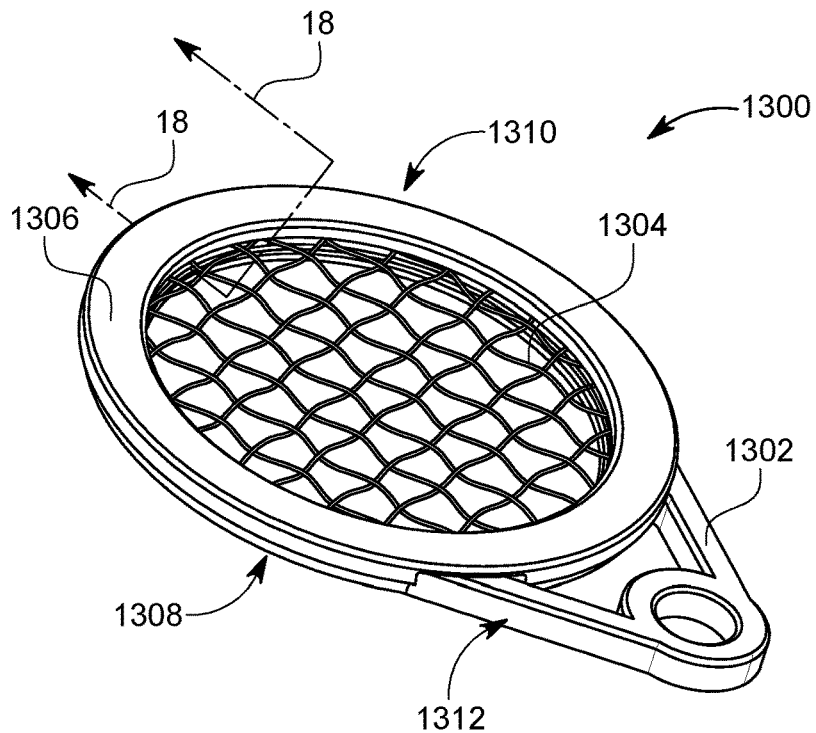
FIG. 13 is an isometric view of the modular comb system in a fourth embodiment.

Referring now to FIG. 13, therein is shown an isometric view of the modular comb system 1300 in a fourth embodiment. The modular comb system 1300 is comprised of a frame 1302, a screen insert 1304, and a locking ring 1306 including a locking mechanism 1308.

Figure 14:
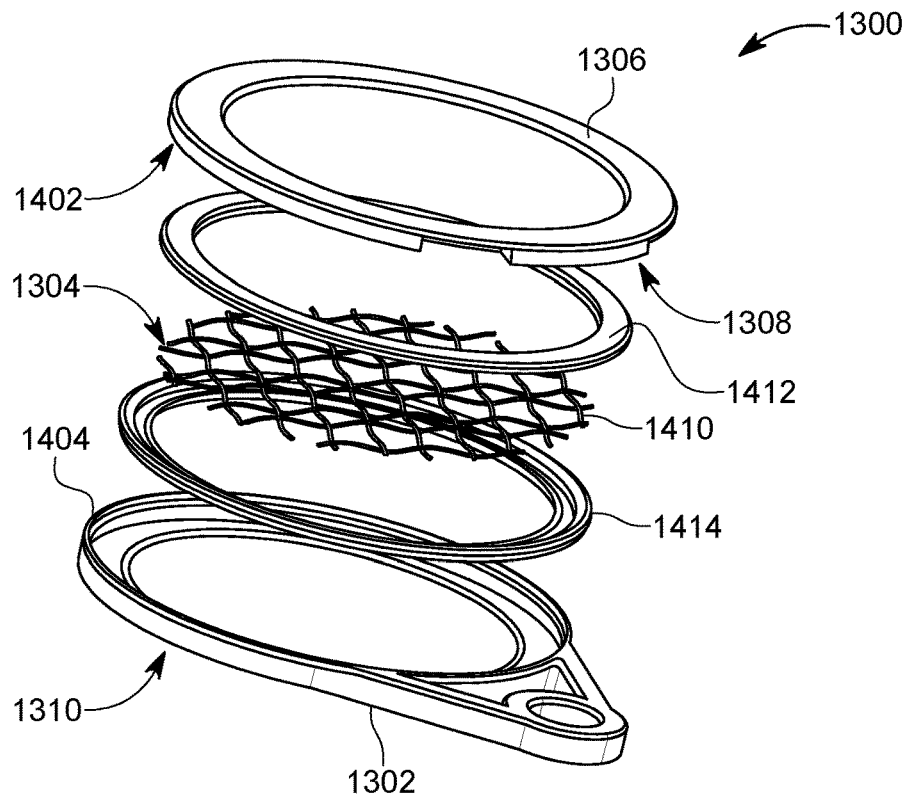
FIG. 14 is an exploded isometric view of the modular comb system of FIG. 13.

The screen insert 1304 can be affixed to the frame 1302 with the locking ring 1306. The locking mechanism 1308 can be threads as is shown in FIG. 14. The locking ring 1306 includes the locking mechanism 1308 for mating with a comb body 1310 of the frame 1302 and locking the locking ring 1306 to the comb body 1310.

The screen insert 1304 is depicted in a fixed position with respect to the frame 1302 based on the locking ring 1306 being locked to the comb body 1310. That is, screen insert 1304 is shown affixed between the locking ring 1306 and the frame 1302.

The frame 1302 can include the comb body 1310 and a handle 1312. The comb body 1310 and the handle 1312 can be integrally formed with or affixed during manufacture.

It is contemplated that the frame 1302 can be formed of a durable washable material such as an injection molded plastic, metal, fiberglass, or a combination thereof. The frame 1302 is contemplated to be formed in a size that can fit within a standard sized pants pocket.

The screen insert 1304 can provide multiple different intersecting patterns. Illustrated herein are square patterns, which as shown in FIG. 12, can be of multiple different sizes. The screen insert 1304 can be formed of a nylon, stainless steel, or similar situated material, which is durable, flexible, and washable.

The handle 1312 can taper from the width of the comb body 1310 to a circular end 1314 having a hole 1316. The circular end 1314 having the hole 1316 has been discovered to provide enhanced comfort and ergonomic manipulation of the modular comb system 1300. Particularly, the hole 1316 being at least 1 inch provides a benefit in that the thumb of a user can be placed therein and the modular comb system 1300 can be spun or otherwise manipulated in the hand.

Referring now to FIG. 14, therein is shown an exploded isometric view of the modular comb system 1300 of FIG. 13. The modular comb system 1300 is shown having the locking ring 1306 and the screen insert 1304 positioned over the comb body 1310 of the frame 1302.

The locking mechanism 1308 is shown as female threads 1402 on an inner facing surface of the locking ring 1306 for mating with and locking to male threads 1404 on an outer facing surface of the comb body 1310 of the frame 1302. As will be appreciated, the locking mechanism 1308 can be distributed along a perimeter of the locking ring to fit within the handle 1312 or to lock on either side of the handle 1312. The screen insert 1304 can include a screen 1410, a front screen ring 1412, and a back screen ring 1414.

The screen 1410 can be held firmly between the front screen ring 1412 and the back screen ring 1414 with a friction fit as is shown in greater detail in FIG. 18 below. The front screen ring 1412 and the back screen ring 1414 are shown with threads for affixing the front screen ring 1412 to the back screen ring 1414 with the screen 1410 therebetween.

Other embodiments could include the front screen ring 1412 and the back screen ring 1414 being held together simply by being placed between the locking ring 1306 and the frame 1302 when locked. Yet another embodiment includes the front screen ring 1412 and the back screen ring 1414 being held together with screws similar to those of FIG. 2.

Figure 15:
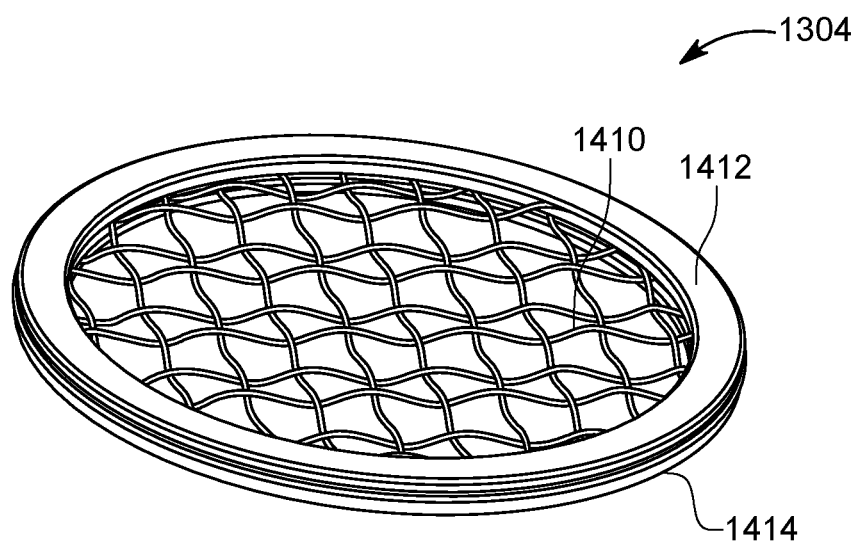
FIG. 15 is an isometric view of the screen insert of FIG. 13.

Referring now to FIG. 15, therein is shown an isometric view of the screen insert 1304 of FIG. 13. The screen insert 104 is shown with the screen 1410 between the front screen ring 1412 and the back screen ring 1414. The screen insert 1304 includes the screen 1410 having edges covered by the front screen ring 1412 and the back screen ring 1414.

Figure 16:
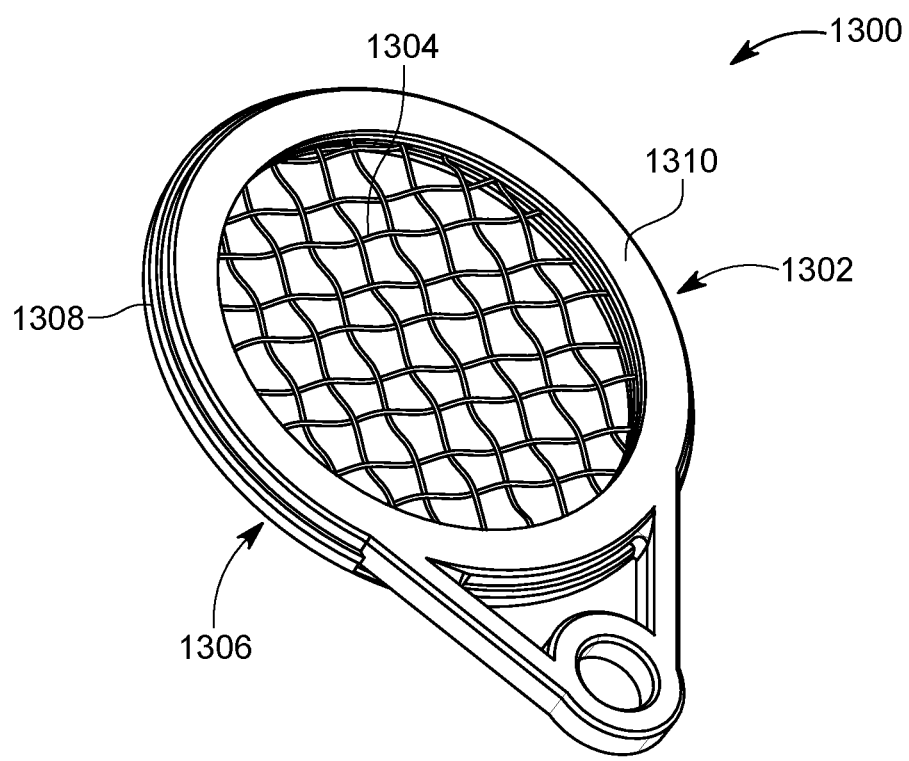
FIG. 16 is a backside isometric view of the modular comb system of FIG. 13.

Referring now to FIG. 16, therein is shown a backside isometric view of the modular comb system 1300 of FIG. 13. The modular comb system 1300 is shown with the locking mechanism 1308 of the locking ring 1306 extended over a portion of the comb body 1310 of the frame 1302 in order to lock the screen insert 1304 with respect to the frame 1302.

Figure 17:
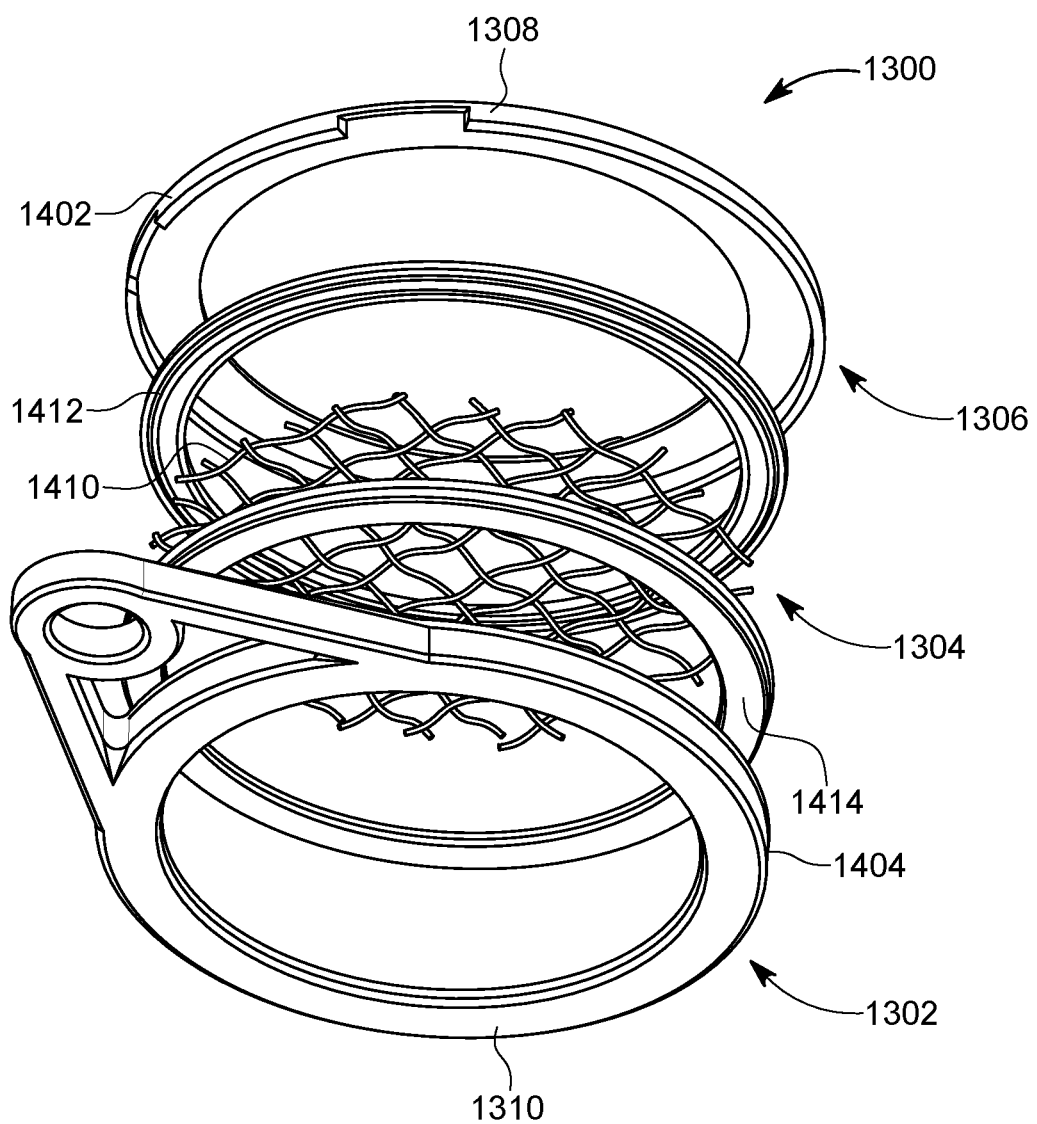
FIG. 17 is a backside exploded isometric view of the modular comb system of FIG. 13.

Referring now to FIG. 17, therein is shown a backside exploded isometric view of the modular comb system 1300 of FIG. 13. The modular comb system 1300 is shown having the locking ring 1306 and the screen insert 1304 positioned over the comb body 1310 of the frame 1302.

The locking mechanism 1308 is shown as the female threads 1402 on an inner facing surface of the locking ring 1306 and mated to male threads 1404 on the outer facing surface of the comb body 1310. The female threads 1402 can lock and mate with the male threads 1404. The screen insert 1304 can include the screen 1410, the front screen ring 1412, and the back screen ring 1414.

Figure 18:
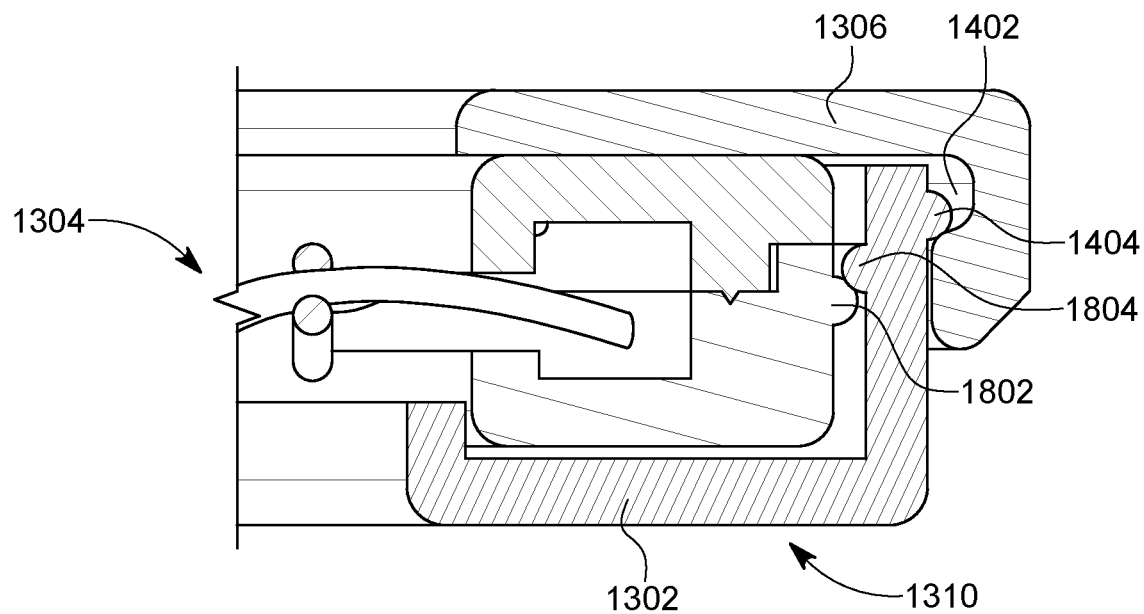
FIG. 18 is a cross-sectional view along the line 18-18 of FIG. 13.

Referring now to FIG. 18, therein is shown a cross-sectional view along the line 18-8 of FIG. 13. The locking ring 1306 with the female threads 1402 is shown mated to the male thread 1404 on the comb body 1310 of the frame 1302.

The screen insert 1304 is shown sandwiched between the locking ring 1306 and the frame 1302. The screen insert 1304 is further shown with the back screen ring 1414 including a threaded portion 1802 for locking the screen insert 104 to an internal thread 1804 of the frame 102. An edge of the screen 1410 can be fully surrounded by the back screen ring 1414 and the front screen ring 1412 and can be contained within a pocket formed from both the front screen ring 1412 and the back screen ring 1414.

Figure 19:
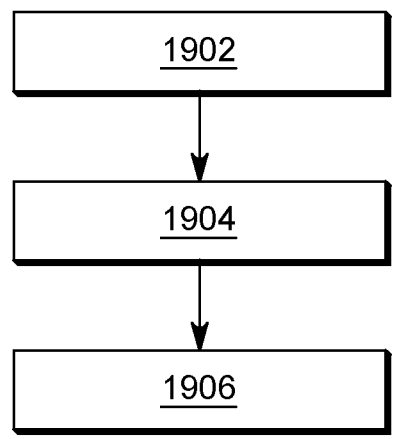
FIG. 19 is a control flow for manufacturing the modular comb system.

Referring now to FIG. 19, therein is shown a control flow for manufacturing the modular comb system. The control flow can include forming a frame including a comb body in a block 1902; forming a locking ring including a locking mechanism for mating with the comb body and for locking the locking ring to the comb body in a block 1904; and forming a screen insert configured to be in a fixed position with respect to the frame based on the locking ring being locked to the comb body in a block 1906.

Thus, it has been discovered that the modular comb system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the modular comb system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A modular comb system comprising:
   a frame including a comb body, the frame having a recess;
   a locking ring including a prong for locking the locking ring to the comb body based on the prong being extended through and exiting the recess and the prong being exposed from an external peripheral surface of the frame; and
   a screen insert configured to be in a fixed position with respect to the frame based on the locking ring being locked to the comb body.

2. The system of claim 1 wherein the screen insert is formed integrally with the locking ring.

3. The system of claim 1 wherein the prong includes a clip configured to mate with the recess in the frame.

4. The system of claim 1 wherein the screen insert is coupled to the locking ring with a screw.

5. The system of claim 1 wherein the screen insert is affixed between the locking ring and the frame.

6. A modular comb system comprising:
   a frame including a comb body and a handle, the frame having a recess;
   a locking ring including a prong for locking the locking ring to the comb body based on the prong being extended through and exiting the recess and the prong being exposed from an external peripheral surface of the frame; and
   a screen insert configured to be in a fixed position with respect to the frame based on the locking ring being locked to the comb body.

7. The system of claim 6 wherein the screen insert is one of multiple screen inserts having different sized screen holes.

8. The system of claim 6 wherein the handle tapers from a width of the comb body to a circular end.

9. The system of claim 6 wherein the screen insert includes a screen having edges covered by a screen ring.

10. A method of manufacturing a modular comb system comprising:

forming a frame including a comb body, the frame having a recess;

forming a locking ring including a prong for locking the locking ring to the comb body based on the prong being extended through and exiting the recess and the prong being exposed from an external peripheral surface of the frame; and forming a screen insert configured to be in a fixed position with respect to the frame based on the locking ring being locked to the comb body.

11. The method of claim 10 wherein forming the screen insert includes integrally forming the screen insert with the locking ring.

12. The method of claim 10 wherein forming the prong includes forming a clip configured to mate with the recess in the frame.

13. The method of claim 10 further comprising coupling the screen insert to the locking ring with a screw.

14. The method of claim 10 further comprising affixing the screen insert between the locking ring and the frame.

15. The method of claim 10 wherein forming the frame includes forming the frame having a handle.

16. The method of claim 15 wherein forming the screen insert includes forming multiple screen inserts having different sized screen holes.

17. The method of claim 15 wherein forming the frame having the handle includes forming the handle tapering from a width of the comb body to a circular end.

18. The method of claim 15 wherein forming the screen insert includes forming a screen having edges covered by a screen ring.

\* \* \* \* \*